T. G. CUMMINGS.
AUTOMATIC NAILING MACHINE.
APPLICATION FILED AUG. 30, 1915.

1,225,317.

Patented May 8, 1917.
10 SHEETS—SHEET 1.

Inventor
Thomas G. Cummings
By Moulton & Lurrance
Attorneys.

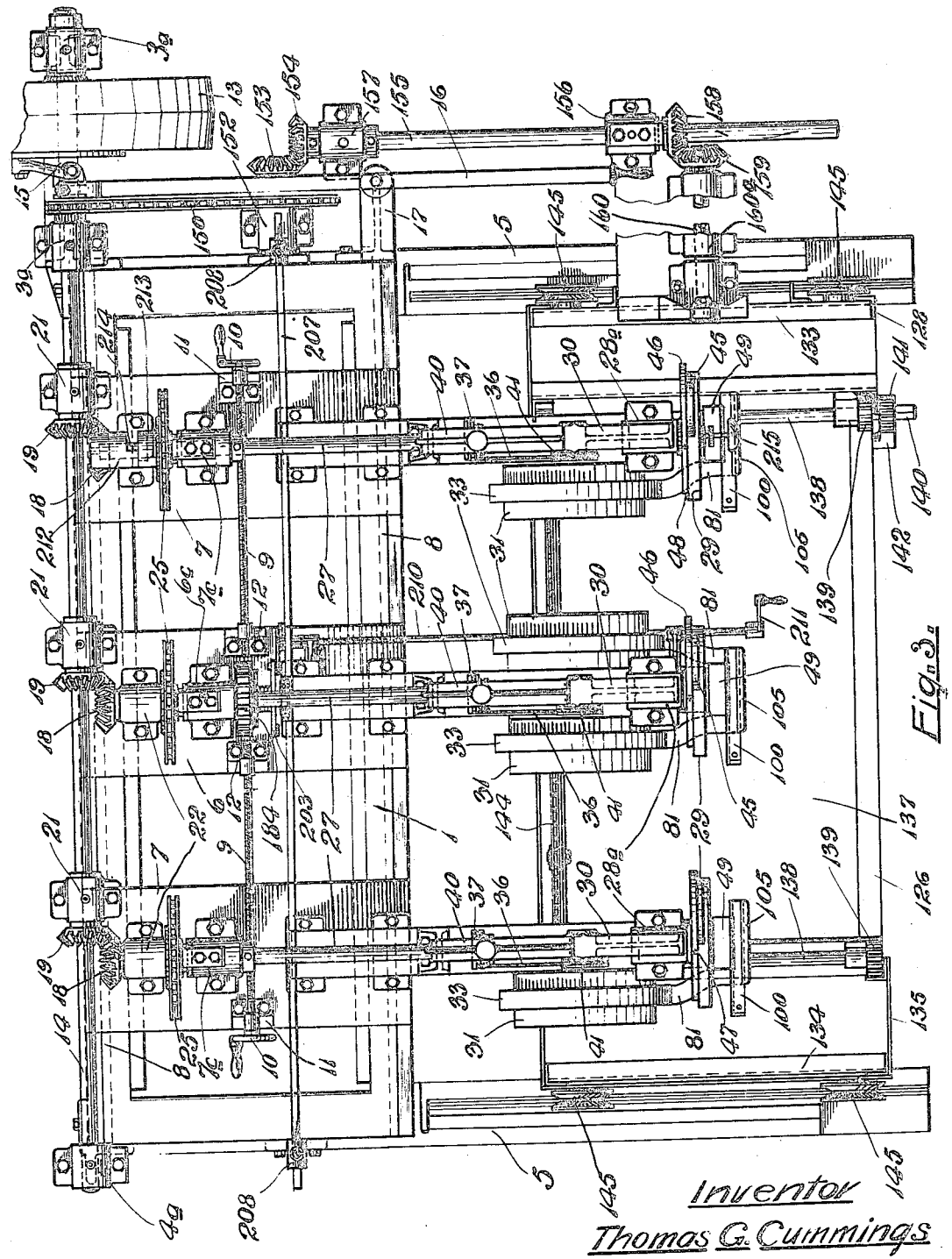

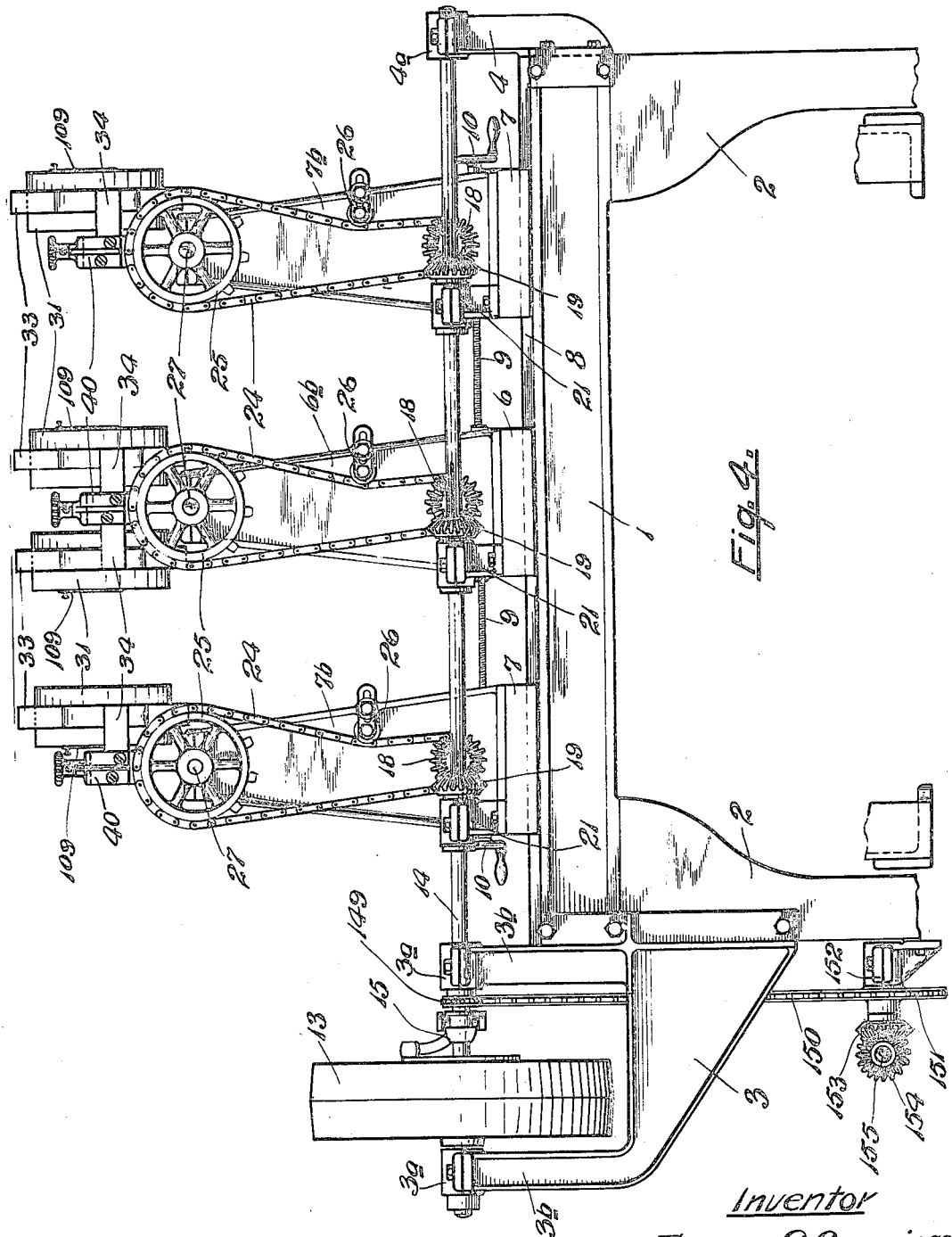

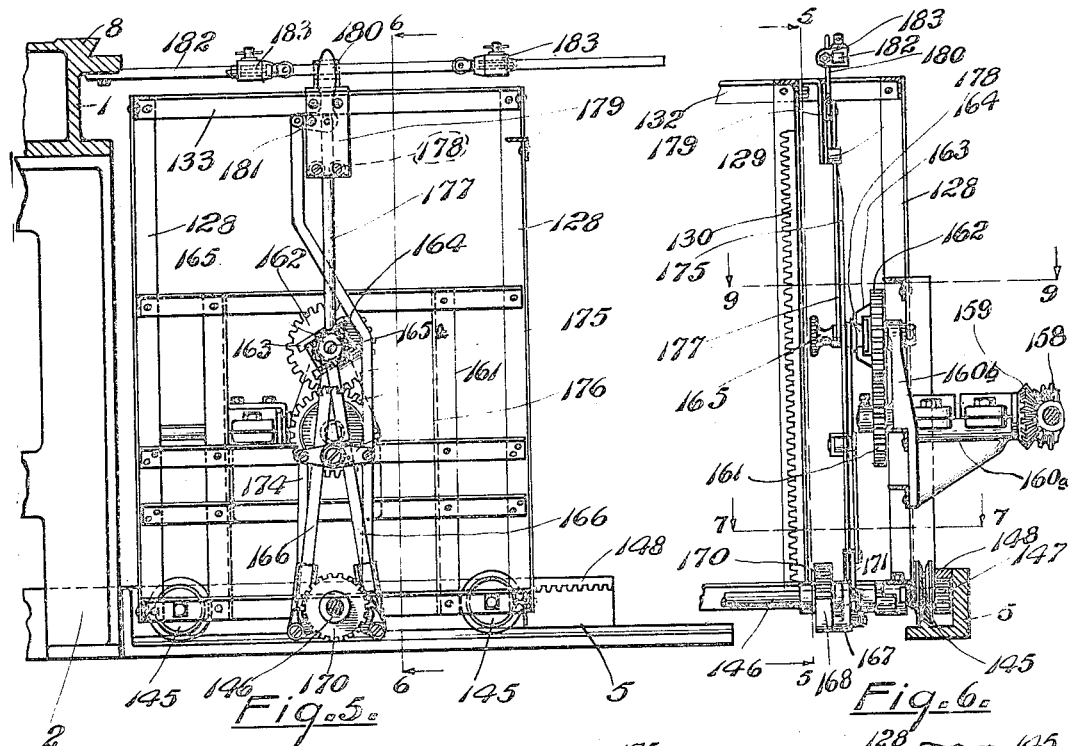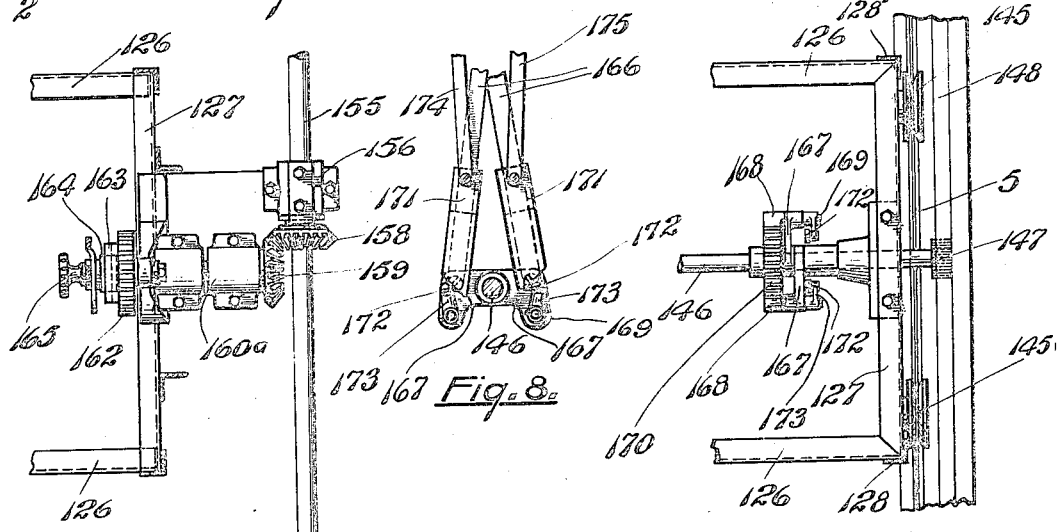

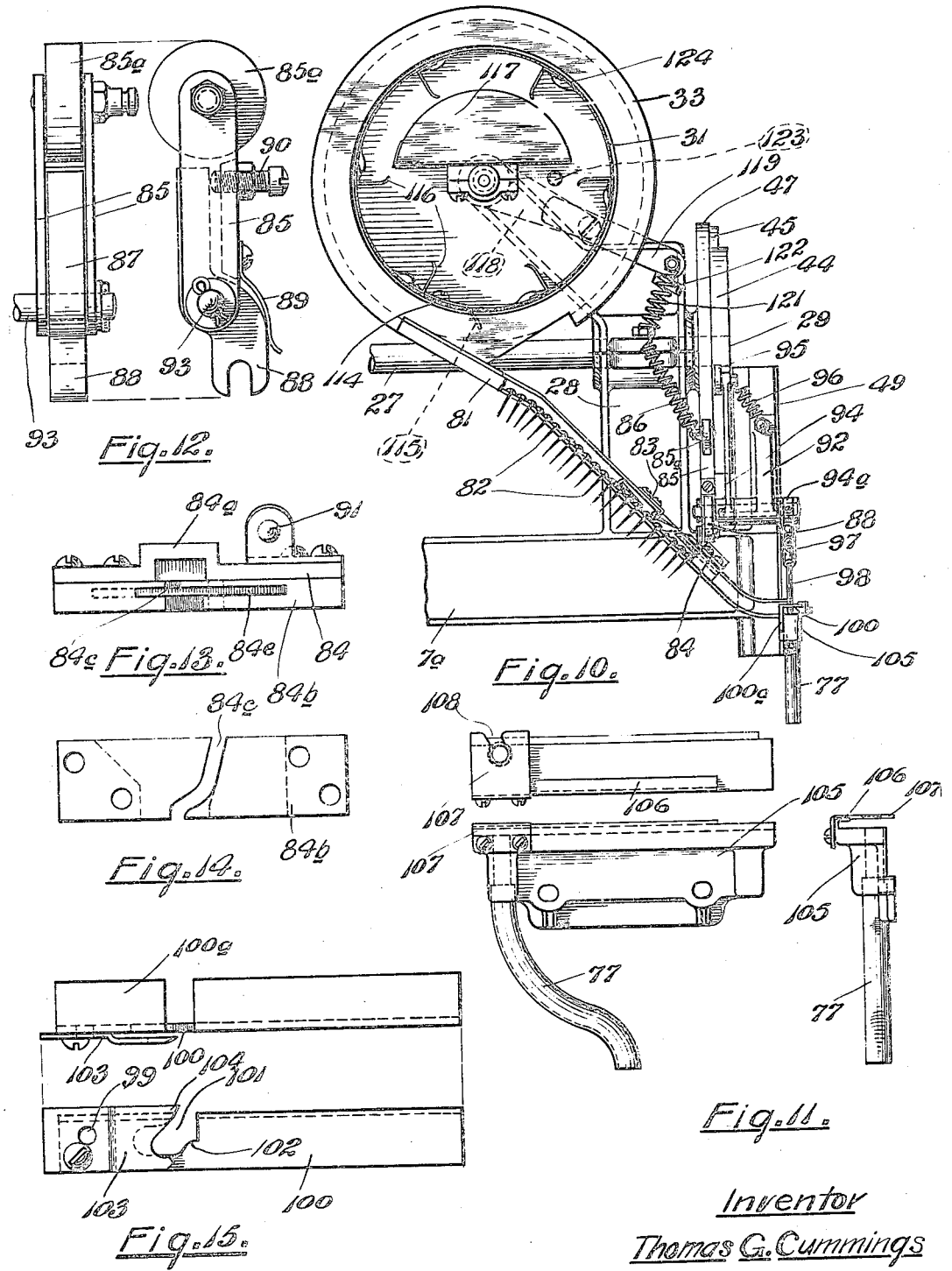

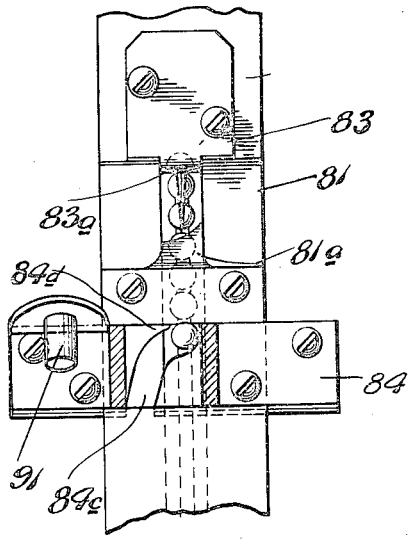
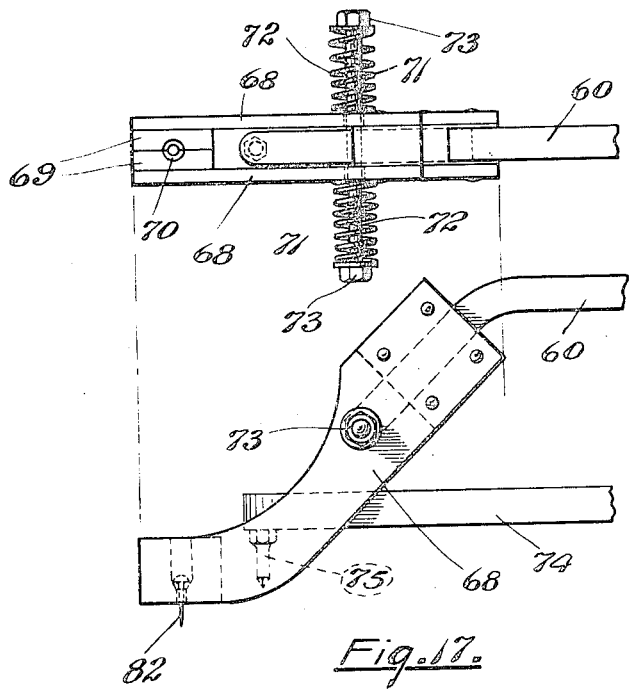
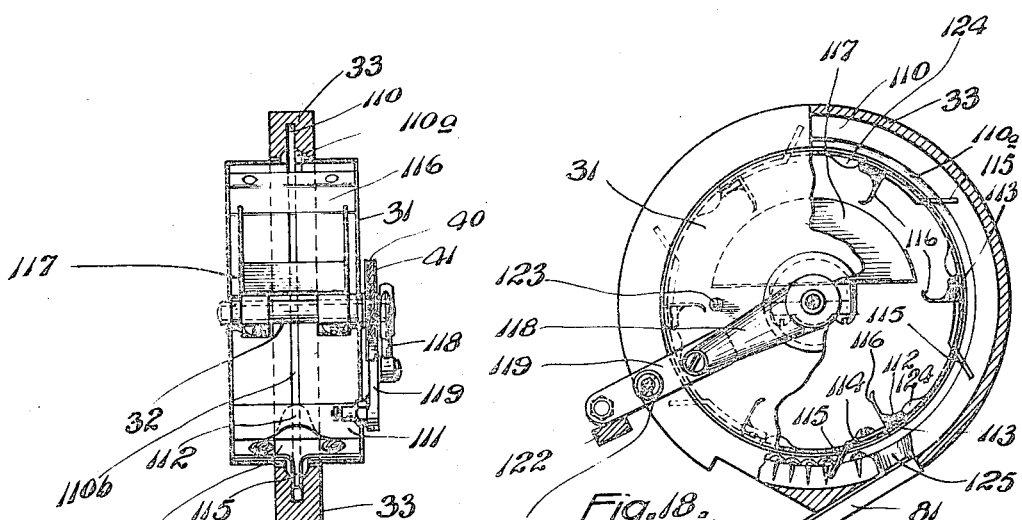

T. G. CUMMINGS.
AUTOMATIC NAILING MACHINE.
APPLICATION FILED AUG. 30, 1915.

1,225,317.

Patented May 8, 1917.
10 SHEETS—SHEET 8.

Inventor
Thomas G. Cummings
By
Moulton & Lirrance
Attorneys

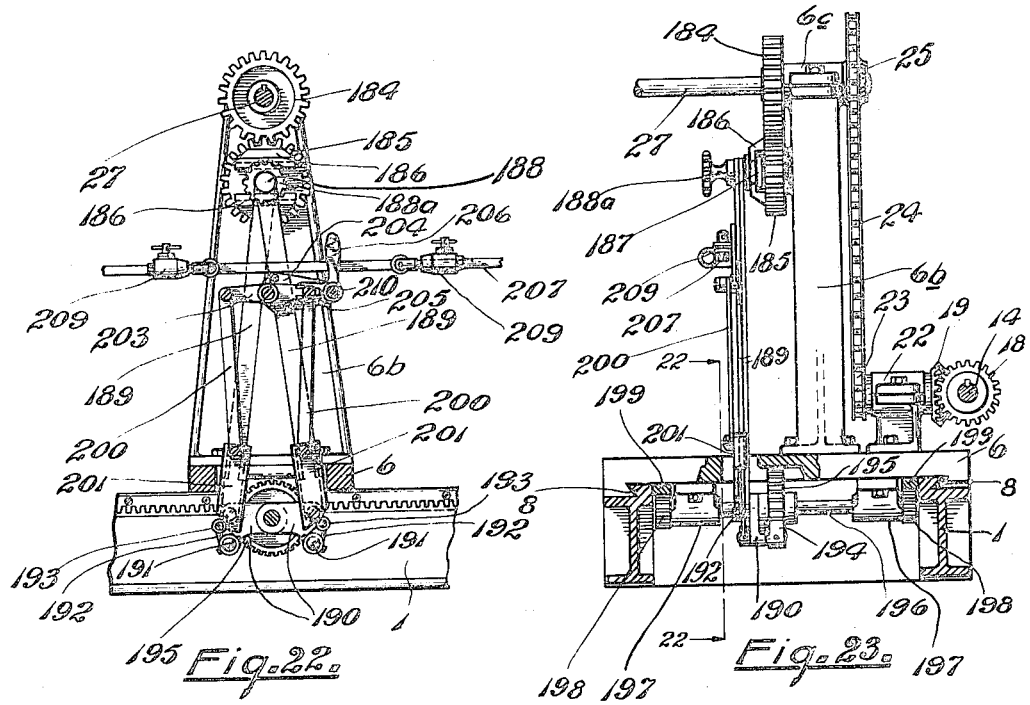
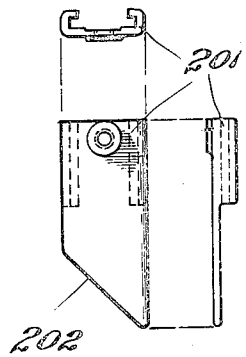
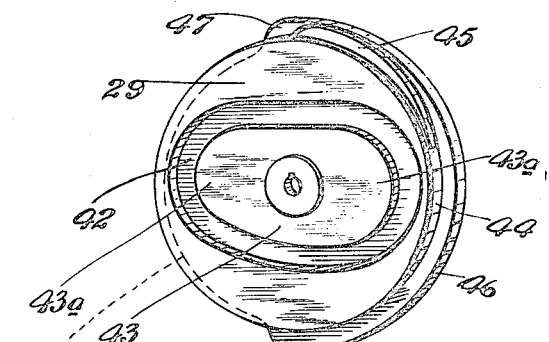

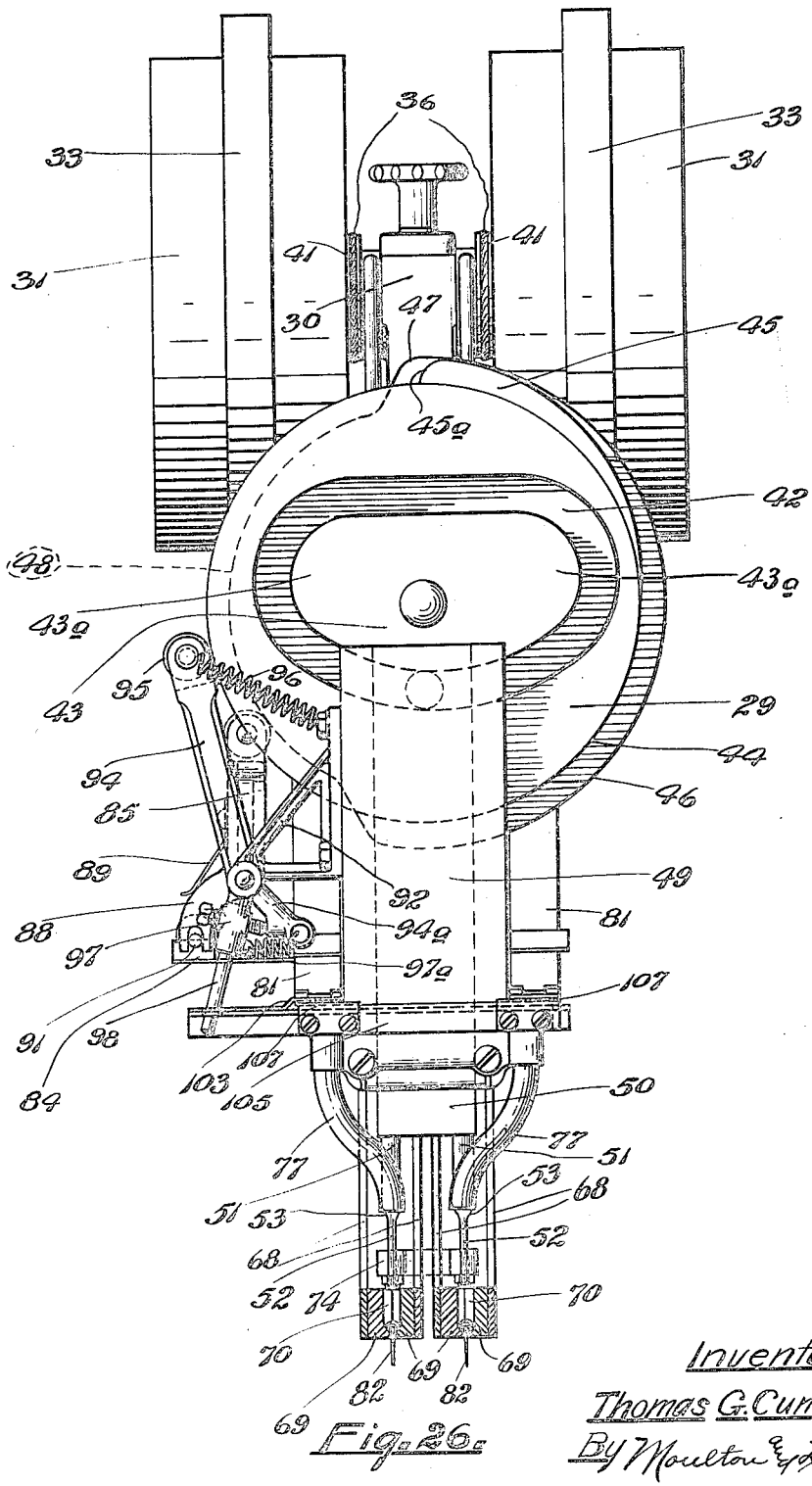

UNITED STATES PATENT OFFICE.

THOMAS G. CUMMINGS, OF GRAND RAPIDS, MICHIGAN, ASSIGNOR OF ONE-HALF TO PATRICK GRANT, OF GRAND RAPIDS, MICHIGAN.

AUTOMATIC NAILING-MACHINE.

1,225,317.

Specification of Letters Patent.

Patented May 8, 1917.

Application filed August 30, 1915. Serial No. 47,974.

*To all whom it may concern:*

Be it known that I, THOMAS G. CUMMINGS, a citizen of the United States of America, residing at Grand Rapids, in the county of Kent and State of Michigan, have invented certain new and useful Improvements in Automatic Nailing-Machines; and I do hereby declare the following to be a full, clear, and exact description of the invention, such as will enable others skilled in the art to which it appertains to make and use the same.

This invention relates to automatic nailing machines, and is especially concerned with a machine for automatically nailing or tacking metal strips or bands upon trunks. The invention, however, is not limited to one particular use but may be used quite as well in many other relations. It is an object and purpose of the invention to provide a machine of this character which will automatically punch an opening in a band lying against the trunk thereafter feeding a tack into position and driving it in the opening and into the trunk. A further object of the invention is to provide a work holder carriage connected with the machine which, in the operation of the machine, may be automatically moved step by step so that a continuous operation of nailing the full width of a trunk may be had with the nails spaced equal distances apart. Another object of the invention is to provide mechanism for similarly moving the nailing mechanism relative to the work step by step so that a continuous nailing of the trunk throughout its entire length may be had, the nails being positioned at equal spaced apart distances. A still further object is the provision of novel constructions for effecting the step by step movement of the work holder back and forth toward and from the machine and of similarly effecting the step by step movement of the nailing mechanism longitudinally of the machine and over the work acted upon by the machine. Various other objects and purposes than those specifically enumerated together with novel and useful constructions for carrying out the same will be apparent as understanding is had of the embodiment of the invention disclosed in the accompanying drawings, in which;

Fig. 3 is a plan view.

Fig. 4 is a rear elevation similar to Fig. 1.

Fig. 5 is a sectional view on the line 5—5 of Fig. 6 looking in the direction indicated by the arrows.

Fig. 6 is a similar view on the line 6—6 of Fig. 5.

Fig. 7 is a horizontal section taken on the line 7—7 of Fig. 6.

Fig. 8 is a fragmentary end elevation of a detail of construction relating to the step by step mechanism for moving the work holder.

Fig. 9 is a sectional view on the line 9—9 of Fig. 6.

Fig. 10 is a partial side and sectional view enlarged of the nail receiving magazine and the mechanism adjacent thereto.

Fig. 11 shows in plan and in front and end elevation a detail of the guide for feeding the nails singly in position for nailing.

Fig. 12 is an end and front elevation of the lever that operates the separator slide which separates the tacks one at a time in the way leading from the magazine.

Fig. 13 is a front elevation of the tack separating slide.

Fig. 14 is an underneath plan view thereof.

Fig. 15 shows a rear elevation and plan view of the shuttle.

Fig. 16 is a fragmentary plan and sectional view showing the operation of separating one tack in the way and the means for eliminating tacks not properly positioned in the way.

Fig. 17 shows in plan and side elevation a fragment of the nail holder and punch.

Fig. 18 is a partial side and sectional elevation of the nail magazine taken from the side opposite that shown in Fig. 10.

Fig. 19 is a vertical section therethrough.

Fig. 22 is a section on the line 22—22 of Fig. 23.

Fig. 23 is a view taken from the right of Fig. 22, parts thereof being shown in section.

Fig. 24 shows in plan and in front and side elevation an element of the step by step mechanism.

Fig. 25 is a perspective view of the operating cam for the nailing mechanism; and Fig. 26 is an enlarged front elevation of said cam and associated parts pertaining to the central nailing device of the nailing machine.

Like reference characters refer to like parts throughout the several views of the drawings.

Figure 1:
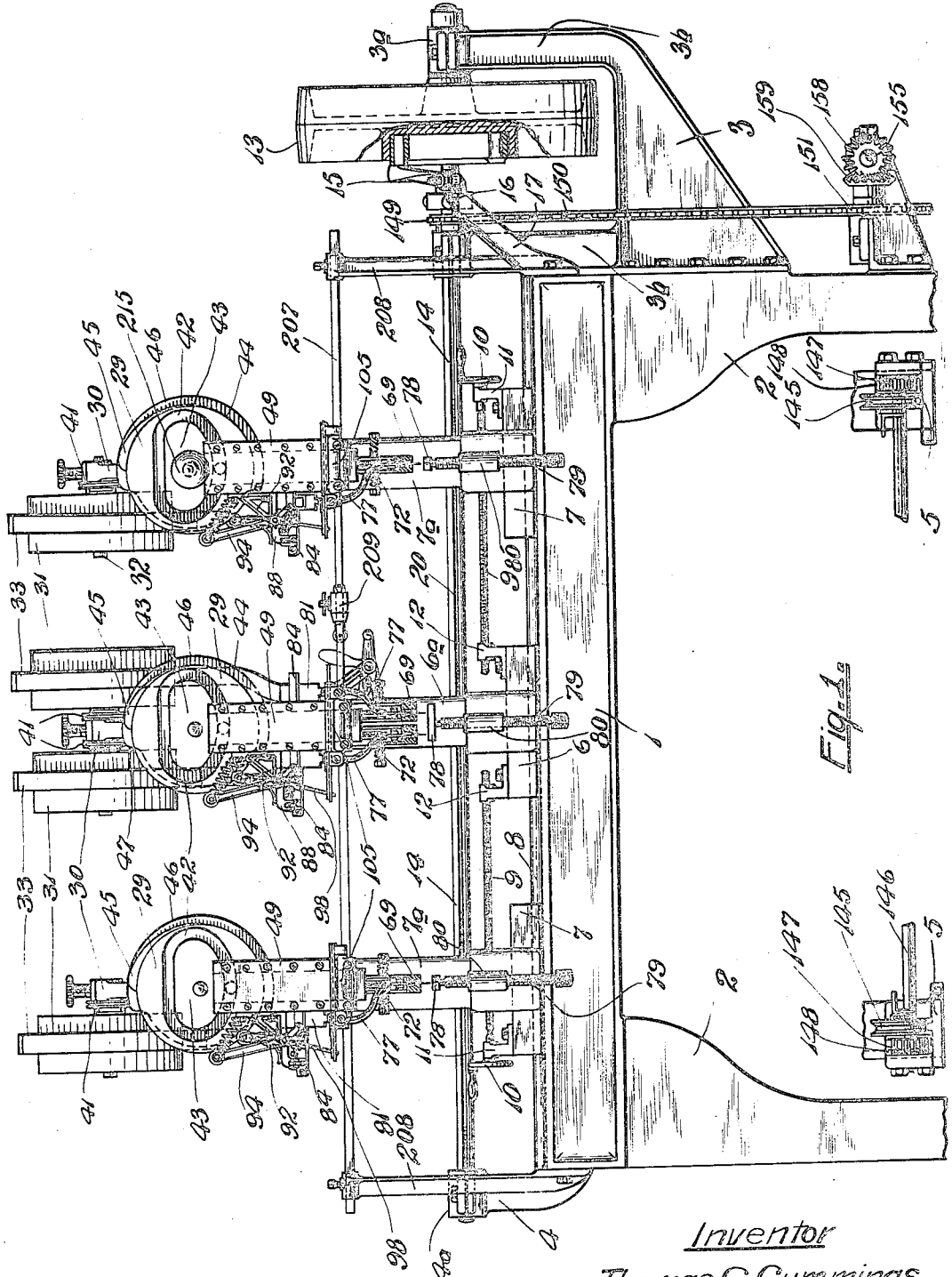
Figure 1 is a front elevation of the nailing machine, the work holding portion of the machine being removed.
Figure 2:
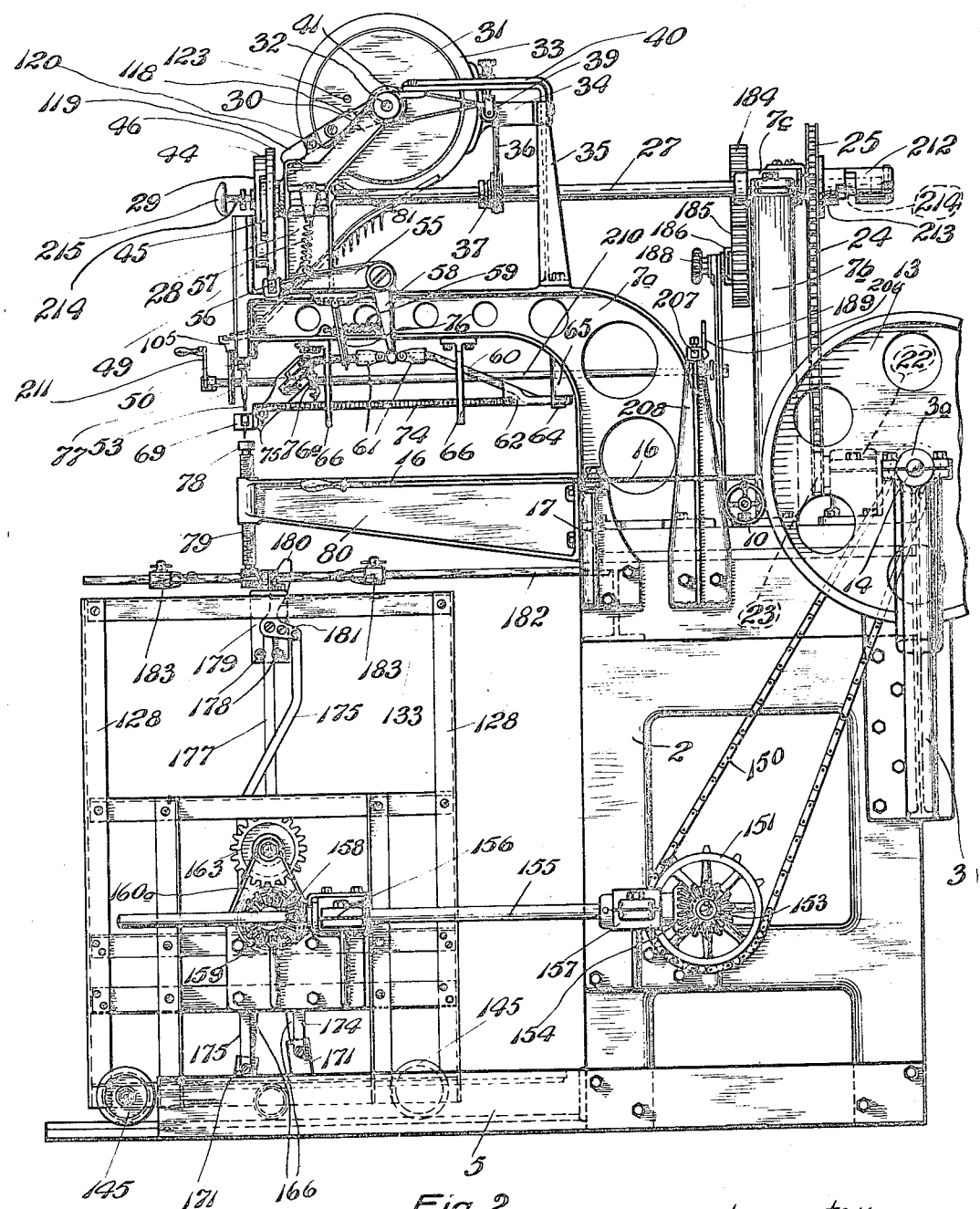
Fig. 2 is an end elevation taken from the right hand end of the machine.

The mechanism of the nailing machine is supported by suitable frame members which include horizontal bed pieces 1 carried at either end by upright supports 2. A bracket 3 is connected to the support 2 at the right hand end of the machine while a smaller bracket 4 is similarly connected at the other end of the machine, these brackets being used to support the driving shaft as will hereafter appear. From each of the supports 2 at the lower ends thereof rails 5 project forwardly to serve as supports for the movable work holder carriage.

The bed pieces 1 are spaced a distance apart and on their upper sides carry a central casting 6 and two similar castings 7 at each side of the central casting. These castings are grooved on their lower sides to receive the dovetail ribs or guides 8 formed on the upper sides of the bed pieces, the castings being in this manner mounted for slidable movement lengthwise of the bed pieces. Screws 9, at their outer ends carrying hand wheels 10, are supported by brackets 11 on the castings 7 and thread through suitable nuts cast integral with brackets 12 on the central casting 6 whereby all of the castings may be tied together with the end castings adjustable toward or from the central casting as will be apparent by reason of this connection between them.

The mechanism is driven by any suitable motor or other source of power through a drive wheel 13 loosely mounted upon a main shaft 14 which is carried in bearings 3ª and 4ª formed on the brackets 3 and 4 respectively. The drive wheel 13 is located between the arms 3ᵇ of bracket 3 and a bearing 3ª is formed at the upper end of each of the arms 3ᵇ as shown. By means of any suitable clutch mechanism 15, the drive wheel 13 may be connected with shaft 14, and a lever 16 pivotally mounted between its ends to a bracket 17 secured to the frame members of the machine is used to manually effect this connections, said lever being operatively connected with the clutch.

In the construction of the machine there are provided three bevel pinions 18 meshing with similar pinions 19 slidably mounted on the shaft 14. A keyway 20 is cut in and extends the full length of the shaft, keys on the pinions 19 seating loosely therein whereby the pinions rotate with said shaft though free to move lengthwise thereof. The shaft 14 extends through bearings formed on brackets 21 one of which is secured to each of the castings 6 and 7 while the pinions 18 are connected with or secured at the ends of short shafts rotatably mounted in bearings 22 formed on brackets similarly connected to the castings 6 and 7. At their front ends said short shafts carry sprocket wheels 23 each driving an endless sprocket chain 24 which passes around a larger sprocket wheel 25, the chains being tightened by suitable devices 26. The sprocket wheels 25 are secured at the rear ends of shafts 27 which project forward to the front of the machine, these shafts at their rear ends and the chain tighteners 26 being supported on upright brackets 6ᵇ and 7ᵇ secured respectively to the castings 6 and 7 heretofore described.

The forward ends of the shafts 27 are supported by brackets 28 projecting upwardly from supporting brackets 6ª and 7ª connected to the castings 6 and 7 in front of the upright brackets 6ᵇ and 7ᵇ. A cam 29 is fixed to the front end of each shaft 27 and rotates therewith while projecting above and to the rear of the brackets 28 are brackets 30 carrying magazines 31 adapted to receive the tacks used in the mechanism. The magazines are loosely mounted on shafts 32 rotatably mounted in suitable bearings in the brackets 30. Surrounding the magazines 31 are heavy metal rings 33 which are supported by connecting braces 34 attached to uprights 35 which in turn are carried by the brackets 6ª and 7ª it being understood that this construction so far as the hopper, outer ring and support therefor is duplicated for the central mechanism. Each shaft 32 is rotated by means of a belt 36 which passes around a driving pulley 37 on the shaft 27 over a pulley 39 supported by the bracket 40 serving to change the direction of the belt, and finally around a pulley 41 rigidly connected to a face of the magazine.

In the front face of each cam 29 a continuous groove 42 is cut as shown leaving an inner elongated cam 43 having two oppositely positioned and rounded ends 43ª. The cam also includes in its construction a front portion having a circular outline as indicated at 44 which at one portion of its circumference has a cam 45 projecting therefrom. At one end cam 45 has an abrupt shoulder 45ª, the outer surface of said cam then curving inwardly gradually until it meets the circular surface 44 heretofore described. Included also in the construction of the cam 29 and back of the front portion and the cam 45 is a portion having an outer curved surface 46 concentric with the rotative axis of the cam and of a diameter larger than the diameter of the surface at 44 for an arc greater than 180 degrees as shown, this surface then changing directions abruptly at the shoulders 47 and joining with the circular cam surface 48 for the rest of the circumference, surface 48 being also concentric with the rotative axis of the cam but having a diameter less than the diameter of the front portion 44. At its front end each bracket 7ª, and similarly the central bracket 6ª is provided with an upright extension 49 formed as a hollow guide to carry the plunger 50 vertically therein, this plunger at its rear side being provided with a pin or roller which is received within the groove 42 of the cam 29. It will be evident that with each revolution of a cam 29 the plunger is moved through two complete reciprocatory movements, being forced to its lowest position as the curved ends 43 are rotated to their lowest position. The plunger 50 at its lower end carries a cylindrical member 51 tapering into a punch 52, the diameter of which is less than that of the part 51 and the juncture of the two parts 51 and 52 is of substantially conical shape as indicated at 53. The plunger 50 for the central nailing mechanism has two of these members 51 while each of the plungers at the end nailing mechanism has but one.

Pivotally mounted upon each of the forwardly extending portions of the brackets 7ª and also on the same part of the central bracket 6ª is a bell crank lever 54 having a horizontal arm 55 carrying at its end a roller 56 which bears against the surfaces 46 and 48 of the adjacent cam 29. The roller is held firmly in contact with the cam through the medium of a coil spring 57. The bell crank lever in its construction also includes a downwardly extending arm 58 actuated by a spring 59, the lower end of which lies closely adjacent an upper bar 60 of a device which may be termed the "tack holder." A pair of spaced apart stops 61 are secured to the bar 60 and the lower end of the arm 58 passes between them. At its rear end bar 60 has a pair of downwardly extending spaced apart plates 62 connected thereto from the rear of which projects a short bar 63 slidably received within the stirrup 64 secured on the underside of a projection 65 cast integral with each of the brackets 6ª and 7ª. Also rigidly attached to the horizontal forward extension of the brackets 6ª and 7ª are a pair of spaced apart downwardly extending guides 66 through which the bar 60 passes. At its forward end bar 60 is turned downward and on the upper and lower sides thereof a pair of blocks 67 are positioned to which are connected the spaced apart plates 68 which extend downwardly and forwardly to a point below the punch 52 heretofore described, each of said plates at its forward end carrying a block 69, which blocks are cut away to form a cylindrical socket 70 for a portion of their depth and restricted in diameter at the lower end so that the end of a tack may pass therethrough while the head of the tack will be received in the enlarged portion of said socket. A rod 71 passes through the plate 68 and the front end of bar 60 projecting to either side thereof, coil springs 72 being located on said rod and received between the heads 73 and the plate 68. These springs under compression serve to force the plates toward each other but on the application of sufficient force will permit their separation and the separation of blocks 69 to a limited extent. A bar 74 is pivoted at its rear end between the plates 62 extending through openings in the guides 66 to a point closely adjacent the blocks 69 and on its underside carries a prick punch 75. Bar 74 normally is held in upper position against the front guide 66 by a coil spring 76ª as shown in Fig. 1 while the nail holding device as a whole is supported by a link 76 pivotally mounted on the underside of the arm 55 of the bell crank lever 54. For the central nailing mechanism it is necessary to duplicate some of these parts especially the plates 68, blocks 69 and sockets 70 which are carried by the front bar 60 of the nail holding device the same as where the single nailing mechanism is used. Similarly there must be two of the prick punches 75 carried by bar 74 but otherwise the construction is not changed.

The operation of the construction thus far described may now be set forth. As shaft 14 rotates it drives shafts 27 and the cams 29 connected thereto whereby with each revolution of the cam the punches 52 are twice moved to their lowest positions of movement. At the same time with each revolution of cam 29 the bell crank lever 54 having the roller 56 riding against surfaces 46 and 48 moves in a counter-clockwise direction when the change is made from surface 48 to surface 46 over the projection 47 depressing the arm 55 and in a clockwise direction when the change is made from surface 46 to surface 48, arm 55 in this instance being elevated and the arm 58 moved forwardly. It will be apparent that with the upward movement of arm 55 and forward movement of arm 58 the tack holding device as a whole is carried forwardly and upwardly and that the socket 70 is carried to a point directly beneath the guide 77 through which the tacks are carried one by one to said socket and that it will remain in this position during the time that the roller 56 is traversing the surface 48. It will also be apparent that while the roller is traversing surface 48 one end 43ª of the cam 43 will force the plunger downwardly and in contact with the upper side of the front end of bar 74 which has been carried forwardly with the forward and upward movement of the nail holding device as a whole. As this occurs the prick punch 75 is forced downwardly and punches an opening in the work which it is designed shall lie upon the block 78 formed at the upper end of a screw 79 which is thus adjustably carried at the forward end of an arm 80 secured to the bracket 7ª as fully shown in Fig. 1. When the cam has moved far enough for the roller 56 to ride over the shoulder 47 on to the surface 48 the tack holder as a whole is carried to the rear and takes the nail or tack which it has received from the guide 77 with it, the tack holder assuming the position shown in Fig. 1 with the punch 53 directly above the nail. Then while the tack holder is at rest with roller 56 traversing the surface 46, the other end 43ª of the cam 43 again operates the punch downwardly driving the nail into the opening in the work which is located above the block 78, the nail clenching as it is forced against this block. In the operation of driving, the punch bears against the head of the nail just as the conical surface 53 engages with the sides of openings 70 to force the jaws apart thus permitting the head of the nail to pass between the jaws as it is driven without injuring the blocks 69.

The tacks 82 are fed to the guides 77 through a way 81 which is interposed between each guide and its associated magazine 31. The tacks are normally positioned in the guide, points downward, as shown in Fig. 10, there being provided a slot in the underside of the way 81 through which the ends thereof project. The way is closed for the greater portion of its length above the separator slide on its upper side but just before it reaches this slide an opening of sufficient width is made in the way on the upper side to permit the ejecting of any tack which is not in proper position for separation from the remainder of the tacks. The ejecting device 83 is a plate secured to the upper side of the way 81 as shown and having its front end 83ª narrowed and bent downwardly into the opening in the upper side of the way as shown in Fig. 16. As the tacks move by gravity downward under the ejecting device any tack not properly positioned will have its head engaged by the end 83ª and its point turned upwardly so that as the movement of the tacks as a whole progresses the point is carried above the cam surface 81ª, as shown in Fig. 16, and guided away from the remaining tacks and ejected. This insures that the tacks as they reach the separator slide 84 shall all come to it in proper position with their points extending downwardly through the underside of the way.

The separator slide 84 comprises an upper plate having an intermediate raised portion 84ª for permitting the passage of the tack heads to which is connected a lower plate 84ᵇ in which an irregular shaped slot 84ᶜ is cut, a tapered point 84ᵈ being formed at the upper end of the slot as shown. Slot 84ᶜ extends transversely of the part 84ᵇ and there is also formed in said part a longitudinal slot 84ᵉ through which a section of the way 81 is passed for the purpose of supporting the slide and permitting it a limited back and forth movement. The slide normally occupies a position such that the lip 84ᵈ interposes itself in the path of movement of the tacks. When the slide is moved, however, to the position shown in Fig. 16, the tacks move downwardly through gravity and one tack enters into the slot 84ᶜ as shown until it strikes against a side of the slot, then as the slide moves back to its opposite extreme of movement, the lip 84ᵈ engages back of the tack and forces it in a downward direction, this one tack passing through the slot 84ᶜ and into the way 81 below the separator slide. The central separation slide is modified to serve in the two ways 81 in a similar manner.

The mechanism for actuating the separator slide includes a pair of spaced apart bars 85 which at their upper ends carry between them a roller 85ª bearing against the surfaces 46 and 48 of the cam 29, a coil spring 86 attached to said bars holding the roller firmly in contact with said surfaces. A member 87 having a forked lower end 88 is positioned between the lower ends of the bars 85 and is engaged by a leaf spring 89 to force it against a set screw 90 by means of which part 87 may be adjusted relative to the bars. The forked lower end of the member 87 engages with a pin 91 projecting from a member secured to the separator slide 84 so that as the cam rotates and actuates the device, the slide is operated back and forth relative to the way 81. This device for operating the separator slide is supported by a bracket 92 secured at one side of the head 49 heretofore described, the spaced apart bars 85 and the member 87 interposed between them being pivotally mounted on a shaft 93 extending through the bracket.

A lever 94 is pivoted to the shaft 93 and at its upper end carries a roller 95 which bears against the surface 44 and is positioned to ride over the cam 45. A coil spring 96 holds the roller in contact with said surface and cam. In front of the bracket 92 a tubular sleeve 97 is loosely mounted on shaft 93 and carries adjustably therein a rod 98 which projects downwardly through an opening 99 in one end of a slidable shuttle 100. The shuttle is formed from angle iron and has a rear depending leg 100ª. A slot 101 is formed in the shuttle and is of a formation to provide a shoulder 102 as shown in Fig. 15. An irregular shaped plate 103 is connected above and to one end of the shuttle, the free end of this plate being bent upwardly a short distance above the upper side of the shuttle 100 and at its free end is cut to form a lip 104. The shuttle is slidably supported in a head 105 rigidly connected in front of the head 49 heretofore described and provided with an overhanging lip 106 to guide the front edge of the shuttle. The member 103 rides over a plate 107 which is secured to an end of the head 105. As the roller 95 strikes the abrupt shoulder 45ª of cam 45 the lever 94 is thrown outwardly and the shuttle moved to the right and the tack which has fallen by gravity against the shuttle is moved so as to come in alinement with the slot 108 formed in the plate 107, the shoulder 102 and lip 104 engaging and guiding the shank and head of the tack through the slot to an opening that communicates with the guide 77. The operation of the shuttle is so timed that the tack will enter guide 77 when the socket 70 in the tack holder is located directly beneath said guide. For the purpose of insuring against breakage of parts if a tack or nail should not properly enter the shuttle or disengage therefrom the sleeve 97 is connected by a coil spring 97ª with a downwardly projecting arm 94ª pinned rigidly to the shaft 93. The tension of the spring normally is sufficient to move the shuttle but is not sufficient to cause the breakage of any parts should the shuttle stick or otherwise become inoperative.

The tacks are entered into the magazines 31 through openings normally closed by doors 109. Each magazine which rotates continuously as the machine is operated, has a slot 110ᵇ in its curved surface in direct communication with a continuous slot 110 formed in its adjacent outer ring 33. Slot 110 is formed with an inner enlargement 110ª adapted to receive the heads of the tacks while the main portion of the slot is of a width sufficient only to receive the shanks thereof. Plates 111 having central raised portions 112 are located transversely of the magazine and secured to the inner curved surface thereof, the raised portions lying directly above the slot 110ᵇ of the magazine. Underneath the raised portions 112 the slot 110ᵇ is enlarged sufficiently to permit an entire tack to drop through from the magazine into the slot 110. A member 114 also connected transversely to the inner curved surface of the magazine has a spring extension 115 projecting through and into the slot 110 whereby any tacks in the slot are carried by the extension to the mouth of the way 81 as the magazine rotates.

Integrally formed with the transverse plates 111 are plates or vanes 116 which project inward radially and have their inner ends slightly curved as shown adapting them to retain a quantity of tacks as the magazine rotates. A hopper 117 is rigidly secured to the shaft 32 and normally occupies a substantially horizontal position above the shaft. A lever 118 rigidly connected to shaft 32 at its end outside a magazine is pivotally connected to a link 119 which in turn is pivotally connected at 120 to the outer ring 33 as a suitable support, a coil spring 121 connected to the outer end of this link causing it to bear normally against a stop 122 and normally holding the parts in the position shown in Fig. 8 in which hopper 117 is horizontal. As the magazine rotates any tacks that do not pass through into slot 110 are carried by the radial vanes 116 upwardly and empty from said vanes into the hopper 117. A pin 123 projecting from one side of the magazine 31 strikes against the free end of link 119 causing it to turn about its pivot 120 overcoming the tension of spring 121 and turning the hopper 117 through a partial revolution or until the pin has passed by the end of the link 119 whereby the tacks previously emptied into the hopper are dumped into the magazine directly above the slot 110ᵇ thereof so that any tacks falling properly may enter between the upstanding guides 124 formed on the inner surface of the magazine and under the raised portion 112, passing thence through the openings 113 into the slot 110 after which they will be carried by extension 115 to the large opening 125 formed in the ring 33 at a point in direct communication with the way 81. As soon as the link 119 is released from contact with pin 123 the hopper 117 returns to its normal horizontal position.

From the foregoing it will be evident that by reason of this novel construction of magazine and hopper, tacks placed in the magazine are continuously agitated and their position changed so that it is impossible for any tack to get into a position in the hopper such that it cannot be eventually guided into the way 81. Irrespective of the quantity of tacks in the magazine if the machine is operated long enough every tack therein will eventually be carried to and guided into the way 81 in the manner described.

Figure 20:
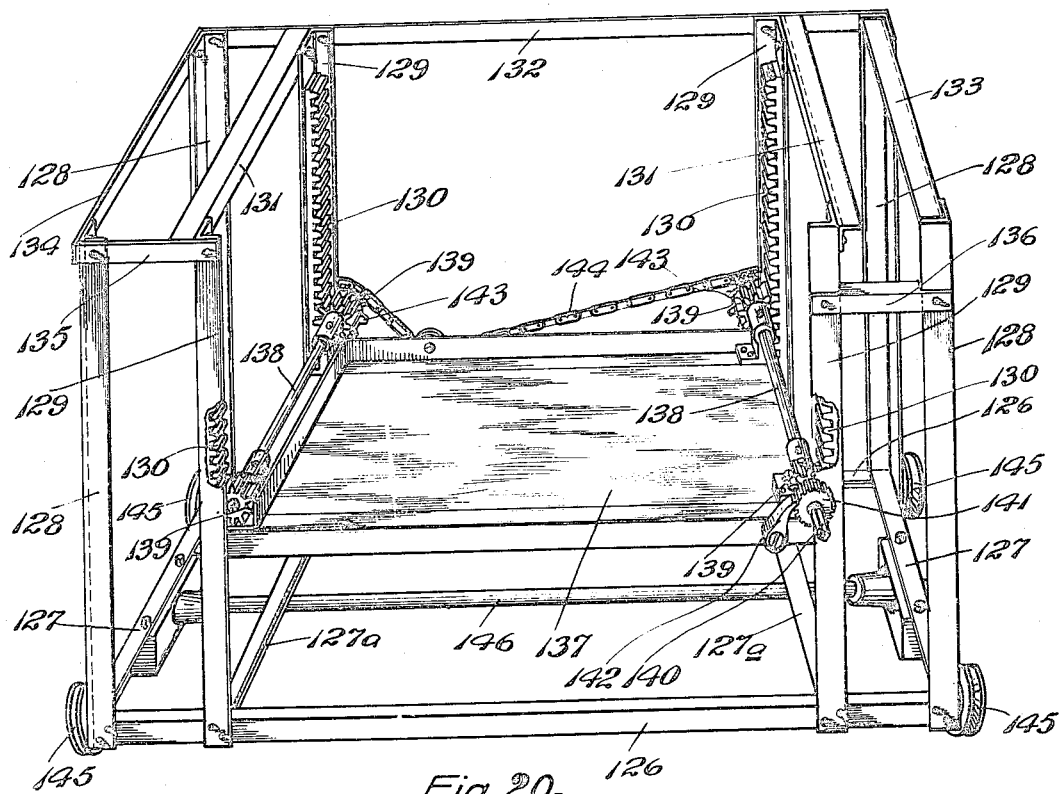
Fig. 20 is a perspective view of the work holder.
Figure 21:
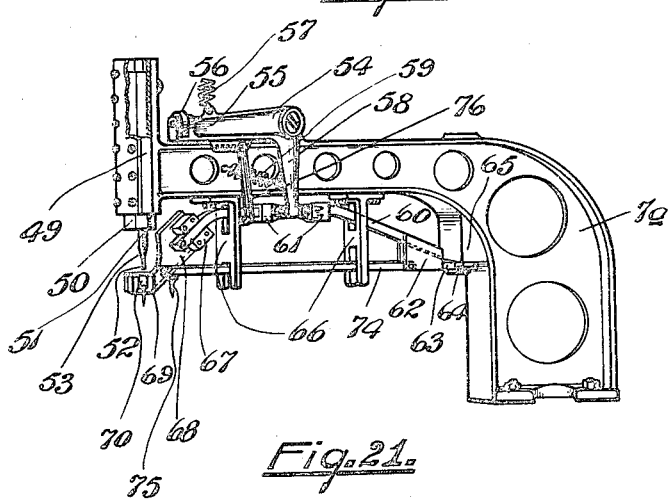
Fig. 21 shows in perspective, with various elements omitted, the nail holding device and punch and its connection with the stationary support therefor.

The trunk or other work to be nailed is positioned on a work holding carriage of the character shown in Fig. 20. In construction this work carriage is formed preferably from angle iron or other conventional commercial forms of iron and includes spaced apart front and rear members 126 connected by end members 127 to make a rectangular frame, upright posts 128 extending from the corners of this frame as shown. A short distance inwardly from each of the posts 128 other upright posts 129 are provided and connected at their lower ends to the front and rear frame members 126. Each of these posts 129 on an inner face carries a rack 130. Posts 129 are connected together in pairs at their upper ends by transverse braces 131 while the rear posts 128 and 129 are tied together by a band 132. Similarly the posts 128 are connected in pairs at each end of the frame by cross ties 133 and 134 while the posts 128 and 129 at the front of the frame are tied together by the short connecting members 135 and 136, the front of the carriage in this manner being left open for insertion of the trunk or other work carried by the carriage which is to be operated upon by the nailing machine.

The trunk is supported on a platform 137. This platform is located between and is adjustable vertically on the racks 130, there being mounted at each end of the platform a shaft 138 provided adjacent either end with pinions 139 engaging with the racks 130. One of the shafts is provided with a squared end 140 and with a ratchet wheel 141 adapted to be engaged by a pawl 142 pivotally mounted on the platform 137. Each of the shafts 138 has a sprocket wheel 143 connected thereto at its rear end and an endless sprocket chain 144 is led around these wheels, whereby upon application of a crank to the end 140 of one of the shafts both may be rotated simultaneously to raise or lower the platform, it being held in any position to which it is adjusted by the engagement of pawl 142 with ratchet 141. In practice the platform is adjusted so that an open side of the trunk or other like article will just pass over the blocks 78 and will lie between said blocks and the nailing punches 53. At each of its lower corners the carriage has a roller 145 connected thereto adapting it to be moved and supported on the tracks 5 heretofore described.

A horizontal shaft 146 lies substantially midway between and parallel to the frame members 126 of the work holding frame. At each end a pinion 147 is connected to the shaft which engages with racks 148 rigidly connected to the track members 5 whereby on rotation of shaft 146 the work holding frame may be moved toward or from the nailing machine depending upon the direction of rotation of the shaft.

I have provided means for automatically operating the cariage toward or from the nailing mechanism step by step during the operation of the nailing mechanism. A sprocket wheel 149 is mounted upon shaft 14 and drives a sprocket chain 150 which in turn passes around and drives the wheel 151 connected to a short shaft mounted in a suitable bearing 152 secured to an end support 2 of the machine. This short shaft also has connected thereto a bevel pinion 153 meshing with a similar pinion 154 fastened to the end of a shaft 155 which is positioned horizontally and extends forward through a bearing 156 formed in any suitable manner on a bracket attached to the carriage. The rear end of shaft 155 is supported in a similar bearing 157. In front of bearing 156 a bevel pinion 158 is splined to shaft 155 and meshes with a pinion 159 fastened to the end of a short shaft 160 which is mounted in a suitable bearing 160$^a$ formed on the same bracket which carries bearing 156. At its inner end shaft 160 carries a spur gear 161 which meshes with and drives a similar gear located directly above it and mounted on a bracket 160$^b$, this gear on its face being provided with spaced apart guides 163 between which is slidably mounted a block 164 which may be fixed in any position to which it may be adjusted with respect to the guides by means of a set or hand screw 165, threaded on to a short bolt or pin 165$^a$ projecting outwardly from the block 164. A pair of links 166 are pivotally mounted at their upper ends on pin 165$^a$ extending downwardly and diverging from each other at their lower ends where they are connected to a pair of levers 167 pivotally mounted upon the shaft 146. Pawls 168 are mounted on shafts 169 extending through the levers 167, the two pawls being adapted to engage with a ratchet wheel 170 secured to shaft 146. Sleeves 171 are slidably mounted on and adjacent the lower ends of the links 166, each having an inclined lower end adapted to contact with a roller 172 mounted at the end of an arm 173 which is pinned to the shaft 169. By forcing a sleeve 171 downwardly and engaging with one of the rollers 172 its associated pawl 168 will be turned away and disengaged from the ratchet wheel 170. Normally if left free the pawls engage with the ratchet wheel by means of any suitable spring construction tending to force them against the ratchet.

Two links 174 and 175 are pivoted at their lower ends one to each sleeve 171. Link 174 is of comparatively short length and at its upper end is pivoted to an end of a lever 176, this lever in turn being pivotally mounted between its ends to a link 166 and at its other end having a pivotal connection to the link 175. Link 175 extends upwardly nearly to the upper frame members of the carriage. A rod 177 mounted at its lower end on the pin 165$^a$ extends vertically between a pair of rollers 178 which are attached to a plate 179 secured to one of the frame members 131. At its upper end rod 177 connects with a pivotally mounted bell crank lever having a vertical arm 180 and a horizontal arm 181 to the end of which the upper end of link 175 is pivotally connected. The bell crank lever is pivotally connected to the plate 179 substantially midway the length of the horizontal arm 181.

By properly adjusting the block 164 a rotation thereof and of the pin 165$^a$ projecting therefrom may be had about the rotative axis of gear 162 when the machine is in operation, the effect of which is to actuate links 166 back and forth in a vertical direction and oscillate the levers 167 about their pivotal support the shaft 146. When the arm 180 of the bell crank lever is positioned vertically both of the sleeves 171 are in contact with their associated rollers 172 and serve to disengage both pawls 168 from the ratchet wheel 170. By operating this bell crank lever in either direction about its point of pivotal support one of the sleeves may be elevated and the other depressed, in this manner freeing one of the pawls for engagement with the ratchet 170 but at the same time keeping the other pawl disengaged whereby with each rotation of the gear 162 a partial rotative movement is given to the shaft 146, in this manner moving the work holding frame relative to its supporting tracks 5. If the bell crank lever is thrown in the opposite direction the direction of movement of the work holding frame is reversed. This may be effected manually as the bell crank lever is in position for ready access and may be easily and readily operated. It is therefore apparent that any work properly clamped and held on the carriage may be moved step by step toward or from the nailing machine and it is designed that the movement shall take place between the nailing operations so that while a nail is being driven the work is at rest. Also by reason of the adjustable feature of the block 164 the space between the nails may be varied and be of any desired distance apart. Accordingly a trunk may be completely nailed at both ends and at the center having a single row of tacks at each end and a double row at the center by the use of my machine which will automatically move the trunk forward toward the machine and will properly and equally space the tacks apart.

I have provided means to automatically govern and stop the movement of the carriage when it has reached a certain position or when the nailing with respect to a certain trunk or other article operated upon has been completed. A bar 182 is connected to the front bed piece 1 and extends forward adjacent the upright arm 180 of the bell crank lever being slidably supported in any suitable manner by the work holding frame. This arm is provided with adjustable stops 183 with one of which the arm 180 contacts as the frame is moved toward or from the nailing machine and which engaging with said arm turns it to upright position and cause the automatic disengagement of both pawls 68 from the ratchet wheel 170. In this manner an automatic stopping of the movement of the work holding frame may be effected as will be readily understood.

I have also provided a mechanism for moving the nailing devices as a whole over the trunk or other work operated upon by them and in a direction lengthwise of the bed of the machine. On the shaft 27 for the central nailing mechanism a spur gear 184 is secured meshing with and driving a similar gear 185 which is provided with guides 186 on a face thereof similar to the guides 163 on the face gear 162. These guides are adapted to adjustably receive the block 187 from which a pin 188 projects, the block being secured in position by tightening the hand wheel 188$^a$. A pair of links 189 extend downwardly from the block and diverge outwardly at their lower ends being pivotally connected each to a lever 190 mounted upon the shaft 196 which lies transversely of the bed of the machine and is supported in suitable bearings 197 connected to the bed. Each of the levers 190 carries a short shaft 191 on one end of which is secured an arm 192 having a roller 193 mounted at the end thereof. At the opposite end of the shaft a pawl 194 is fixed which meshes with the ratchet wheel 195 fixed on the shaft 196. Gears 198 are secured at each end of this shaft engaging with racks 199 positioned lengthwise of the bed plate and secured to the underside of the castings 6 and 7.

A pair of links 200 similar to the links 174 and 175 in the construction shown in Fig. 5 are pivotally connected to slides 201 similar to the slides 171 and having inclined lower ends 202 and slidably mounted adjacent the lower ends of the links 189, links 200 at their upper ends having pivotal connection to the ends of the transverse lever 203 which is pivotally connected to a plate 204 secured to one of the links 189. A bell crank lever having a horizontal forked arm 205 and a vertical arm 206 is mounted adjacent this plate and a rod 207 extending lengthwise of the machine and supported at its ends by brackets 208 projecting upwardly from the bed of the machine, lies closely adjacent the upright arm 206 of the bell crank lever, the rod 207 carrying adjustable spaced apart stops 209 adapted to engage with this arm. The bell crank lever is secured to a shaft 210 which passes through and is supported at its rear end by the plate 204 and which projects forward at the front end of the machine being provided with a crank 211 at its forward end whereby it may be manually operated to turn the bell crank lever and the associated mechanism connected therewith. This mechanism is very similar to the mechanism used for effecting the step by step movement of the work holder toward and from the machine. The operation is substantially identical, the only difference being that the step by step movement which is imparted to the castings 6 and 7 and the nailing mechanism carried thereby moves said castings lengthwise of the bed plate through the rotation of the shaft 196 and of the gears 198 thereon engaging with the racks 199. When the arm 206 is in vertical position the nailing mechanism is at rest with respect to the bed of the machine but by proper manipulation of this lever the step by step movement may be effected in either direction as desired. The stops 209 serve the same function as do stops 183 on the rod 182, that is, they automatically stop the longitudinal movement of the nailing mechanism at a predetermined point in its travel. The manual control of this longitudinal movement of the nailing mechanism is readily effected through the medium of shaft 210 and crank 211 as will be readily understood.

It may be desirable that certain of the nailing mechanisms shall operate while others remain at rest. I have shown means to accomplish this consisting of a clutch element 212 slidably pinned to the rear end of shaft 27 and operable back and forth a limited distance by means of a rod 214 which extends through the shaft and through the front cam 29 having a front operating head 215 for manual operation. The sprocket 25 in this case will be loosely mounted on the shaft 27 and carry a companion clutch member 213 with which the clutch member 212 is adapted to engage. When the clutch members are engaged the shaft 27 is driven but when disengaged this shaft and the attached nailing mechanism remain at rest. By applying a clutch mechanism of this character to each of the nailing mechanisms any one of the mechanisms or all of them may be controlled at will.

From the foregoing it will be clear that I have provided a nailing machine of the character defined and one which will accomplish all of the functions enumerated in the statement of the invention. Many changes of minor detail of construction may be resorted to without departing from the invention which, though of a complete and practical operative machine which has been thoroughly tried and tested in practice, is yet to be considered merely as diagrammatic and illustrative of the invention and not in any sense as limiting the invention to the specific disclosure made. Accordingly all modifications in structure falling within the scope of the appended claims are to be considered as comprehended by my invention. And while the machine has been shown and described as operating with tacks, it is to be understood that it is as readily operable using nails, bifurcated rivets or other securing devices of similar nature in place of the tacks.

I claim:—

1. In a nailing machine, a supporting frame, a plurality of nailing mechanisms mounted on said frame lengthwise thereof and in alinement, each nailing mechanism overhanging a distance in front of the frame, tracks extending at right angles to the length and in front of said frame, a work holder movably mounted on said tracks, means to drive said nailing mechanisms, means for moving the workholder step by step toward or from the frame, and means for moving the nailing mechanisms step by step lengthwise of the frame and over the workholder, substantially as described.

2. In a nailing machine, a supporting frame, a plurality of nailing mechanisms mounted on said frame in alinement lengthwise thereof, each nailing mechanism overhanging a distance in front of the frame, tracks extending at right angles to the length and in front of the frame, a work-holder movably mounted on said tracks, means to drive the nailing mechanisms, means for moving the work holder step by step toward or from the frame while the nailing mechanisms are in operation, means for similarly moving the nailing mechanisms step by step in either direction lengthwise of the frame and over the workholder, and a manually operated means for the workholder and for the nailing mechanisms for controlling the action of each as to direction of movement and time of operation, substantially as described.

3. In a nailing machine, a supporting frame, a nailing mechanism mounted on the frame, means to drive the nailing mechanism, a work holder positioned below the nailing mechanism and in front of the supporting frame, means interposed between the driving means and the work holder for moving it step by step in a direction at right angles to the length of the frame and toward or from the supporting frame when said driving means is in operation, and means carried by the work holder to reverse the direction of movement of the work holder, substantially as described.

4. In a nailing machine, a supporting frame, a nailing mechanism mounted on the frame, a work holder positioned below the nailing mechanism and in front of the supporting frame, means to drive the nailing mechanism, means driven by the said driving means for moving the work holder in a direction at right angles to the length of the frame back and forth step by step in front of the supporting frame, and means carried by the work holder and engaged by the supporting frame to automatically render said moving means inoperative on attainment of a predetermined position thereof with reference to the supporting frame, substantially as described.

5. In a nailing machine, a supporting frame, a nailing mechanism mounted on the frame, means to drive said mechanism, a work holding frame positioned below the nailing mechanism, and in front of the supporting frame, tracks supporting the work holder, a shaft extending lengthwise of the work holder, racks paralleling the tracks, pinions on the shaft engaging the racks, a ratchet wheel on the shaft, a pair of levers loosely mounted on the shaft and extending in opposite directions, pawls on the levers normally engaging the ratchet wheel, means driven by the driving means to oscillate the levers through a limited arc about the shaft, and means for holding either pawl away from the ratchet, and simultaneously permitting the engagement of the other pawl therewith, substantially as described.

6. In a nailing machine, a supporting frame, a work holder mounted in front of the supporting frame, tracks connected to the supporting frame on which the work holder is movably mounted, a shaft extending lengthwise of the work holder, racks paralleling the tracks, pinions on the shaft engaging the racks, a ratchet wheel on the shaft, levers pivotally mounted on the shaft extending in opposite directions therefrom, pawls on the levers normally engaging the ratchet wheel, a gear mounted on the work holder, means to drive the gear, links eccentrically mounted at their upper ends on the face of the gear, said links at their lower ends being connected to the levers, sleeves having inclined lower ends slidably mounted on the links, means engaged by said sleeves in one position thereof to operate a pawl away from the ratchet wheel, and means to actuate the sleeves, substantially as described.

7. In a nailing machine, a supporting frame, a work holder mounted in front of the supporting frame, tracks connected to the supporting frame on which the work holder is movably mounted, a shaft extending lengthwise of the work holder, racks paralleling the tracks, pinions on the shaft engaging the racks, a ratchet wheel on the shaft, levers pivotally mounted on the shaft extending in opposite directions therefrom, pawls on the levers normally engaging the ratchet wheel, a gear mounted on the work holder, means to drive the gear, links eccentrically mounted at their upper ends on the face of the gear, said links at their lower ends being connected to the levers, sleeves having inclined lower ends slidably mounted on the links, means engaged by said sleeves in one position thereof to operate a pawl away from the ratchet wheel, a rod extending upwardly from and mounted on the face of the gear, a bell-crank lever mounted at the upper end of the rod, a link connected to the bell crank-lever and one of the sleeves, a second link connected to the other sleeve, and a lever pivotally mounted between its ends and pivotally connected at its ends to the said links, substantially as described.

8. In a nailing machine, a supporting frame, a plurality of nailing mechanisms movably mounted on the frame, a single driving means for all the nailing mechanisms, connections between the nailing mechanisms for securing them together and permitting adjustment of the distance between adjacent mechanisms, means driven by the driving means for moving all of the mechanisms simultaneously step by step longitudinally of the supporting frame, a work holder mounted below and in front of the nailing mechanisms, and means for moving the work holder step by step in a direction at right angles to the length of the frame.

9. In a nailing machine, a nailing mechanism including a support, a shaft carried by the support, means to drive the shaft, a cam connected to the shaft having a continuous groove in the face thereof, a plunger slidably mounted in front of the cam having a part entering the groove whereby with each revolution of the cam two reciprocatory movements of the plunger take place, a driving punch carried at the lower end of the plunger, a tack holder including a prick punch, a bell-crank lever having one end bearing against the cam and to which the tack holder is connected, a tack guide, a way leading to the guide and means operated by the cam for passing one tack at a time to the guide with each revolution of the cam, said tack holder being carried by the bell-crank lever supporting it to said guide in time to receive the tack and the prick punch being simultaneously carried into position to be operated upon by the driving punch, substantially as described.

10. In a nailing machine, a support, a nailing mechanism including a nail driving member mounted on the support, a tack holder, a tack feed coöperating therewith for delivering tacks one at a time to the tack holder, means to move the nailing mechanism lengthwise of the support step by step automatically with the operation of the nailing mechanism, one step for each tack delivered to the tack holder, means mounted on the nailing mechanism for effecting a change in direction of the movement of the said nailing mechanism over the supporting frame, and means mounted on the support for rendering the first mentioned means inoperative on attainment of a predetermined position at either extreme of the movement of the nailing mechanism relative to the support, substantially as described.

11. In a nailing machine, a support, a nailing mechanism including a nail driving member mounted on the support, a tack holder and tack feed coöperating therewith, means to move the nailing mechanism lengthwise of the support step by step automatically with the operation of the nailing mechanism, a work holder located in front of the support and below the nailing mechanism, means to move the work holder toward or from the support step by step automatically with the operation of the nailing mechanism, a single means for effecting a change in direction of the movement of the nailing mechanism with respect to the support, a similar means for similarly effecting a change in direction of the movement of the work holder with reference to the support, means in connection with the nailing mechanism to render the moving means therefor ineffective on attainment of a predetermined position of the nailing mechanism with reference to the support, and a similar means rendering the moving means for the work holder ineffective on attainment of a predetermined position thereof with reference to the support, substantially as described.

In testimony whereof I affix my signature in presence of two witnesses.

THOMAS G. CUMMINGS.

Witnesses:
  FRANK E. LIVERANCE, Jr.,
  H. H. YARRINGTON.